(12) United States Patent
Noda et al.

(10) Patent No.: US 9,493,057 B1
(45) Date of Patent: Nov. 15, 2016

(54) SUNROOF APPARATUS

(71) Applicant: AISIN TECHNICAL CENTER OF AMERICA, INC., Northville, MI (US)

(72) Inventors: Hiroyuki Noda, Aichi (JP); Steve Chlapecka, West Bloomfield, MI (US); Robert E. Gore, Ann Arbor, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 0 days.

(21) Appl. No.: 14/813,905

(22) Filed: Jul. 30, 2015

(51) Int. Cl.
  *B60J 7/00* (2006.01)
  *B60J 3/00* (2006.01)
  *B60J 7/043* (2006.01)
  *B60J 7/057* (2006.01)

(52) U.S. Cl.
  CPC .............. *B60J 7/0015* (2013.01); *B60J 7/003* (2013.01); *B60J 7/0435* (2013.01); *B60J 7/057* (2013.01)

(58) Field of Classification Search
  CPC ............................ B60J 7/0007; B60J 7/0015
  USPC ....................................................... 296/214
  See application file for complete search history.

(56) References Cited

U.S. PATENT DOCUMENTS

| | | | | |
|---|---|---|---|---|
| 4,650,244 A * | 3/1987 | Boots | ........... | B60J 7/003 292/DIG. 4 |
| 4,978,165 A * | 12/1990 | Schreiter | ........... | B60J 7/057 296/208 |
| 4,981,290 A * | 1/1991 | Huyer | ........... | B60J 7/05 296/214 |
| 6,179,034 B1 * | 1/2001 | Fuss | ........... | B60J 7/003 160/105 |
| 6,186,587 B1 * | 2/2001 | Entenmann | ........... | B60J 1/2041 160/267.1 |
| 8,141,941 B2 | 3/2012 | Fraley | | |
| 2002/0053410 A1 * | 5/2002 | Mayr | ........... | E06B 3/6722 160/98 |
| 2005/0073175 A1 * | 4/2005 | Breuer | ........... | B60J 7/0015 296/214 |

* cited by examiner

*Primary Examiner* — Dennis H Pedder
(74) *Attorney, Agent, or Firm* — Oblon, McClelland, Maier & Neustadt, L.L.P.

(57) ABSTRACT

A window assembly mounted in a roof of an automobile vehicle having an opening with a sunshade receiver. The window assembly includes a glass panel moveable from a fully closed position, through a slightly open to a fully open position in a two-step motion. The glass panel includes at least one auto release and a roll-up sunshade disposed beneath it having a spring loaded retractable screen via a tensioning and rewinding device and a sunshade latch. The at least one auto release stopper has a predetermined shape and size to engage with the at least one auto release bracket when the glass panel begins to be slightly open in order to disconnect the sunshade latch from the sunshade receiver and let the screen move from a fully closed position to a fully open position under the action of the tensioning and rewinding device.

12 Claims, 5 Drawing Sheets

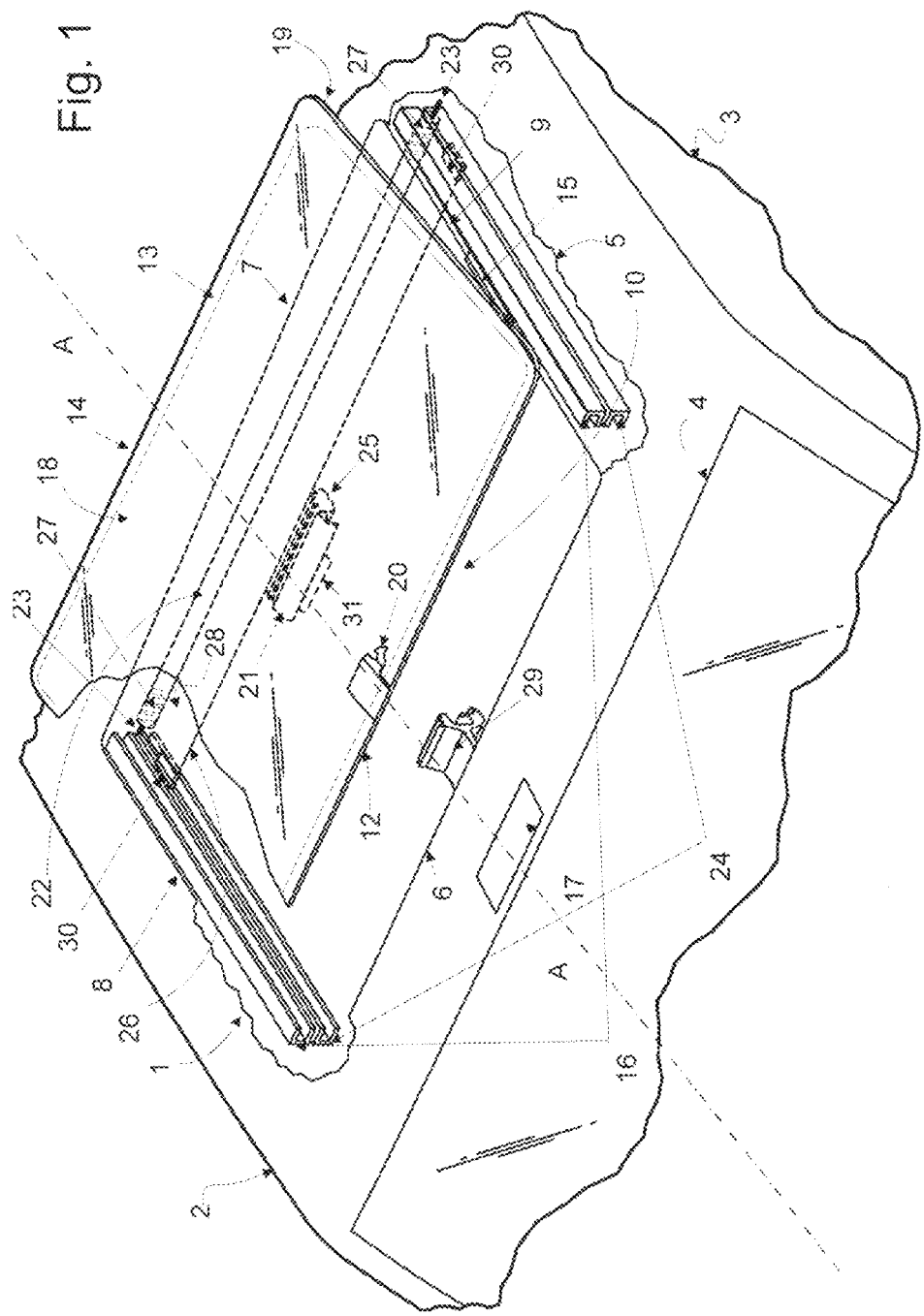

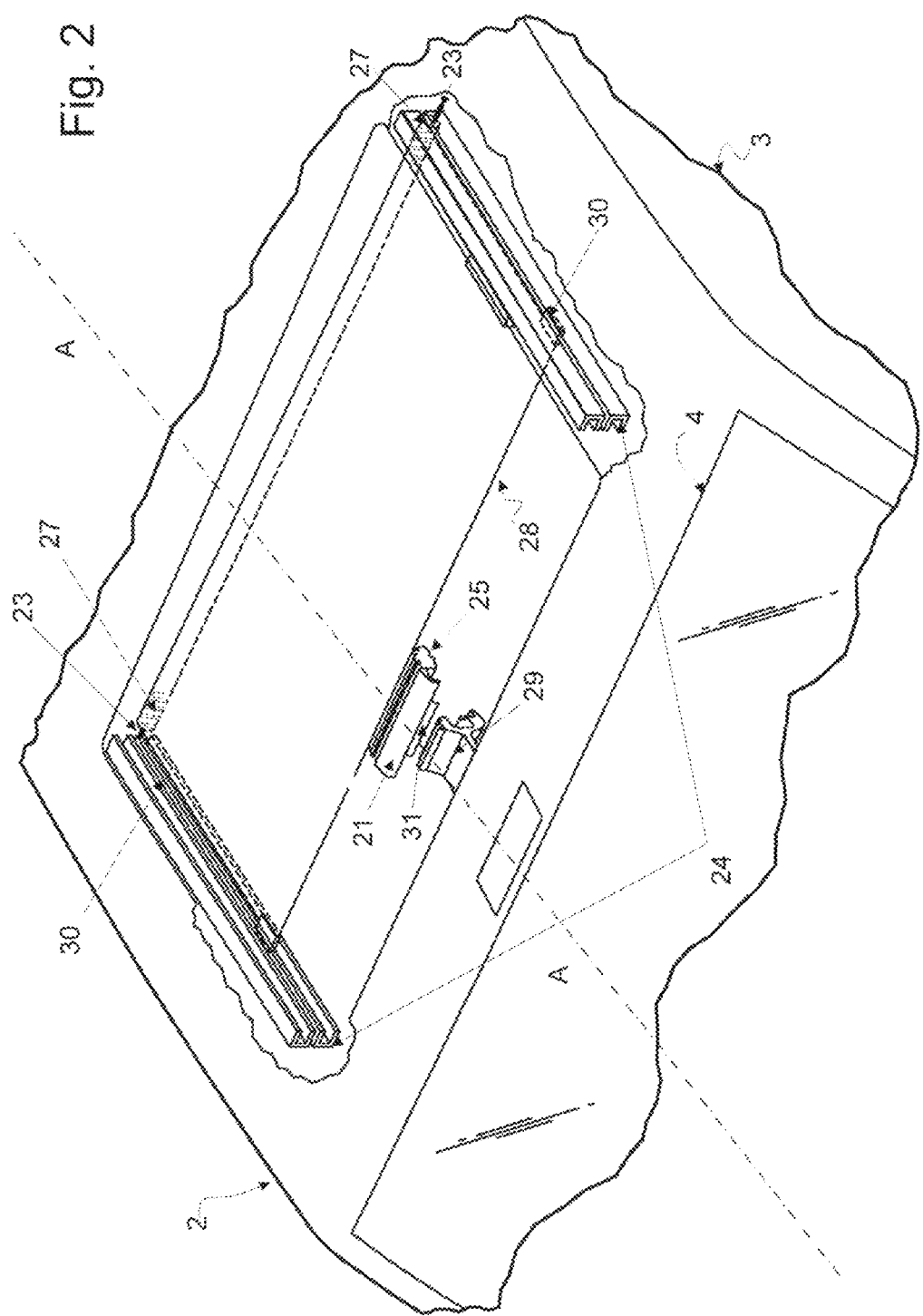

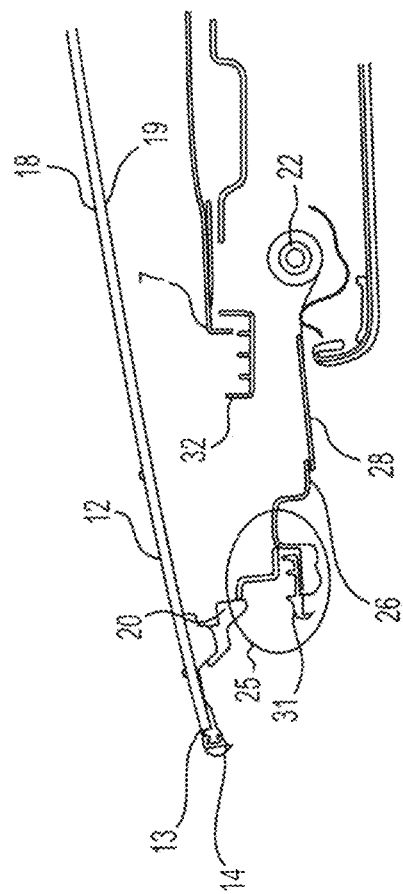
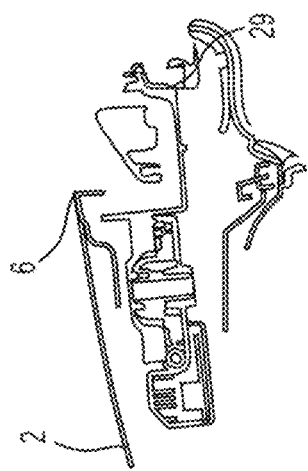
FIG.3C

SUNROOF APPARATUS

BACKGROUND

Field of the Disclosure

The present disclosure relates to an apparatus for the opening of sunshades in vehicle sunroofs. More precisely, embodiments may give additional function of opening sunshades with two-way sunroofs i.e. sunroofs requiring tilt-up and sliding motion for their opening. For example, an automatic and full release function or a function of preventing closure of two-way sunshades as soon as the sunroof is slightly open.

Description of the Related Art

A sunroof is usually paired with a sunshade. This sunshade is generally placed beneath the sunroof glass panel and can be moved between an open and a closed position. In many cases the sunshade is made of an opaque and soft-feel material to block sunlight and dampen noise for keeping the cabin of the vehicle cool and soundproof.

When the sunshade is fully closed, the glass panel is not visible from the cabin and the glass panel position is not apparent to the occupant. Consequently, the glass panel may be left in the open position while the sunshade is fully closed.

Even if the glass panel is slightly open, the cabin of the vehicle may be exposed to elements such as rain or snow. It is then suitable to have an apparatus to prevent the sunshade from fully closing when the glass panel is open.

Sunshade apparatuses with such features are known and used. Typical products of this type are shown, for example, by U.S. Pat. No. 8,141,941 B2 (Fraley). In such a system, a stop is mounted onto the front of the sunshade side facing the glass panel in combination with a catch mounted onto the front of the glass. The catch of the glass engages the stop of the sunshade so as to drag the sunshade from a closed to an open position. Furthermore, once the catch is engaged with the stop, the occupant can no longer close the sunshade. While the disclosure of U.S. Pat. No. 8,141,941 B2 indicates some features for preventing sunshade closing while the glass panel is open, U.S. Pat. No. 8,141,941 B2 discloses a limited number of functions as well as applications, notably in two-way sunroofs.

For example, in apparatuses disclosed by U.S. Pat. No. 8,141,941 B2, to fully open the sunshade while the glass panel is slightly open the user has to manually slide back the sunshade. Such a lack of convenience can impair the abilities of the driver. In addition, with these apparatus it is still possible to have the sunshade apparently closed while the glass panel is in the tilt-up position. Such a limited perception leaves the vehicle prone to weather damage and theft.

SUMMARY

The present disclosure provides an apparatus which overcomes the above-mentioned limitations of conventional sunshades. More precisely, the present disclosure enables automatic full opening and prevents closing of an automatically retractable sunshade in a two-way sunroof.

In brief, this apparatus relies on the interaction between an auto release stopper, mounted onto the glass panel, and an auto release bracket, mounted onto the garnish of the sunroof. The interaction is designed such that a slight opening of the glass panel will release the hook maintaining the sunshade closed. In this way, as soon as the glass panel is slightly open the sunshade is automatically and fully open by being rolled up or slid back. Furthermore, the interaction between the stopper and the bracket is designed such that once the glass panel is open, the hook of the sunshade can no longer be held into its close position i.e., the sunshade can no longer be closed.

The foregoing general description of the illustrative implementations and the following detailed description thereof are merely exemplary aspects of the teachings of this disclosure, and are not restrictive.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein:

FIG. 1 is a perspective view of a two-way sunroof with a sunshade mounted within the roof of an automobile vehicle in a partially open position;

FIG. 2 is a perspective view of an embodiment of the sunshade assembly, in a partially open position; and FIGS. 3A-C are cross sectional views of the operation of the sunshade with the two-way sunroof a fully closed, a slightly open and a fully open position, respectively.

DETAILED DESCRIPTION OF THE EMBODIMENTS

Figure 3A:
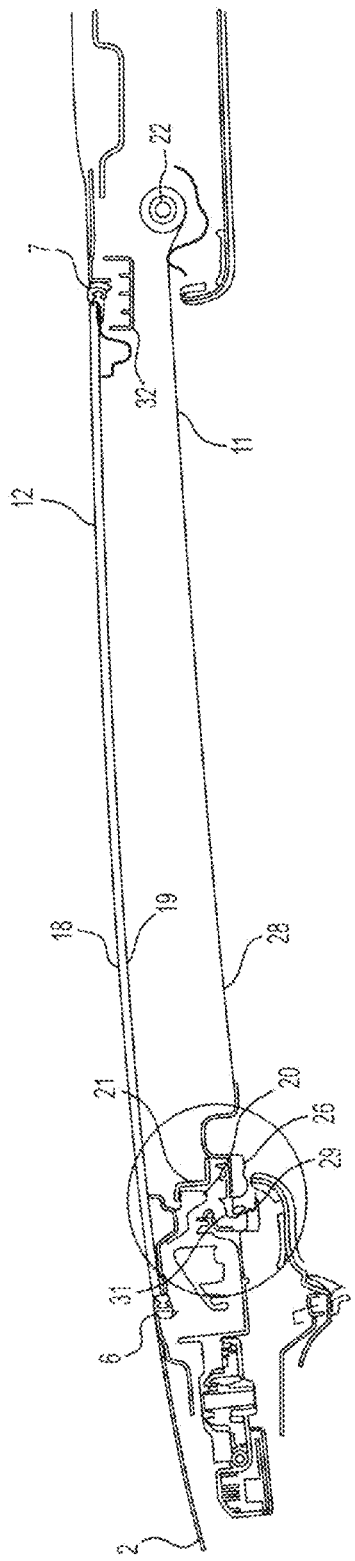

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

As used herein, the terms "sunshade" refers to any type of spring loaded retractable sliding sunshade.

FIG. 1 is a perspective view of an embodiment of a moveable window assembly 1 mounted within a roof 2 of an automobile vehicle 3 to which the present disclosure can be applied. The automobile vehicle 3 includes a front windshield 4 and a roof 2. The roof 2 of the vehicle 3 has an opening 5 which may be rectangular as illustrated in FIG. 1. The rectangular opening 5 includes by a front edge 6 opposite to a rear edge 7 and a right edge 8 opposite to a left edge 9. As used herein, the term "front" refers to the region of the vehicle 3 closest to the front windshield 4, the term "rear" refers to the region of the vehicle 3 closest to the trunk (not shown), the term "right" refers to the region of the vehicle 3 closest to the front seat of the occupant and the term "left" refers to the region of the vehicle 3 closest to the seat of the driver. The roof opening 5 may be placed in the frontal region of the roof 2, as illustrated in FIG. 1, or anywhere on the roof 2 and have any size.

The window assembly 1 comprises a two-way sunroof 10 inserted in the rectangular opening 5 and a sunshade 11 placed beneath it. The two-way sunroof 10 comprises a glass panel 12 surrounded by a reinforcement frame 13 and a seal 14. At least one guide 15 is placed on the right and the left sides of the glass panel 12. The guides 15 are inserted in a pair of glass panel rails 16. One rail extends longitudinally along the right edge 8 of the roof opening 5 while the other rail extends longitudinally along the left edge 9 of the roof opening 5.

The glass panel 12 is moveable from a fully closed position, through a slightly open (i.e. tilt-up) to a fully open position in a two-step motion. In a first step, the glass panel 12 moves from the fully closed position to the slightly open position. More precisely, the glass panel 12 pivots around an axis localized near the front edge of the glass panel 12 and parallel thereto. In other words, for this first step motion, the rear edge of the glass panel 12 tilts upward and parallel to the rear edge 7 of the roof opening 5. In a second step the glass panel 12 moves from the slightly open position to the fully open position. More precisely, the glass panel 12 retracts from the front edge 6 to the rear edge 7 of the roof opening 5 via the action of at least one pair of guides 15 sliding inside the pair of glass panel rails 16. The glass panel 12 may further be linked to a drive system 17 to move the glass panel 12 between the fully closed and open position via an actuator (not shown) located in the cabin of the vehicle 3. The drive system 17 may rely on cables and a motorized or manual reel in order to open and close the glass panel 12.

The glass panel 12 includes an external surface 18 exposed to the external environment and an internal surface 19 facing the cabin. The glass panel 12 further includes at least one auto release stopper 20 affixed at the front of the internal surface 19. The auto release stopper 20 has a predetermined shape and size in order to engage with the auto release bracket 21 of the sunshade 11 when the glass panel 12 begins to be slightly open and disengage with the auto release bracket 21 of the sunshade 11 as soon as the glass panel 12 is open. The auto release stopper 20 is molded or machined in one or several pieces assembled together and fastened onto the internal surface 19 of the glass panel 12 using fastening devices such as a bolt, an adhesive or the combination of both.

FIG. 2 is perspective view of an embodiment of the sunshade 11 assembly, in a partially open position. In this embodiment, the sunshade 11 comprises at least one roller 22 which may be placed behind a pair of sunshade rails 24 and extended along the length of the rectangular roof opening 5. The sunshade rails 24 are placed below the pair of glass panel rails 16. The roller 22 may have a cylindrical shape with a rotating shaft 23 inserted on each side and aligned with central axis of the roller 22. Furthermore, the rotating shafts 23 may be attached to the roof 2 or any other part of the vehicle 3 via supporting elements (not shown) such as brackets. The rotating shafts 23 and supporting elements are used to provide a smooth rotation of the roller 22 around its central axis while maintaining the roller 22 anchored.

A screen 28 made of a sun blocking flexible material, such as dark fabric, is wrapped around the roller 22. The screen 28 may have the shape of a rectangular sheet with a width slightly smaller than the width of the roof opening 5 and a length slightly longer the length of the roof opening 5. The rear part of the screen 28 is attached to the surface of the roller 22 while the front part may be delimited by a sunshade trim 26 covering all or partially the front length of the screen 28. The sides of the screen 28 and the sunshade trim 26 are inserted in the sunshade rails 24. The sunshade trim 26 may further include a pair of guide shoes 30. The guide shoes 30 may be disposed on each side of the sunshade trim 26 and inserted with the sides of the screen 28 in a pair of sunshade rails 24. The pair of sunshade rails 24 may be disposed beneath the pair of glass panel rails 16 and are operable to guide the screen 28 between the closed and open position. In addition, a sunshade latch 25 placed on the sunshade trim 26 enables the screen 28 to be fastened to the vehicle 3 and be maintained in a fully closed position. In addition, tensioning and rewinding devices 27, such as torsion springs, may be placed around the rotating shafts 23 or inside the roller 22 in order to exert a torque on the roller 22 for maintaining the screen 28 under tension when the sunshade latch 25 is engaged with a sunshade receiver 29 and for moving the screen 28 from a fully closed to a fully open position once the sunshade latch 25 is disengaged with the sunshade receiver 29.

Figure 3B:
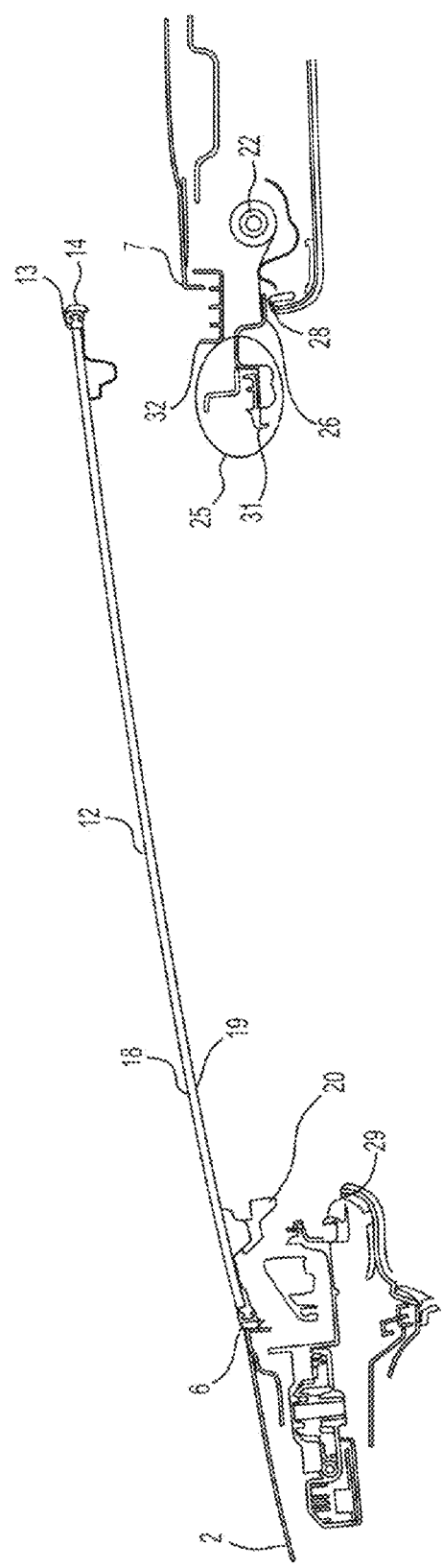

FIGS. 3A-C illustrate the operation of the sunshade 11 with the glass panel 12 in a fully closed, a slightly open and a fully open position, respectively.

FIG. 3A is a cross sectional view of FIG. 1 along the line A-A of an embodiment a two-way sunroof 10 with the sunshade 11 and a glass panel 12 in a fully closed position. The sunshade trim 26 includes at least one hook 31 surmounted by at least one auto release bracket 21. When the glass panel 12 is in a fully closed position, as illustrated in FIG. 3A, the auto release stopper 20 of the glass panel 12 holds down the auto release bracket 21 of the sunshade 11. The low position of the auto release bracket 21 maintains the sunshade hook 31 engaged with the sunshade receiver 29 attached to the body of the vehicle 3.

FIG. 3B is a cross sectional view of FIG. 1 along the line A-A of an embodiment of a two-way sunroof 10 with the sunshade 11 and a glass panel 12 in a slightly open, i.e. tilt-up, position. The tilt-up motion of the glass panel 12 moves the auto release stopper 20 of the glass panel 12 upward which in turn pulls up the auto release bracket 21 of the sunshade 11. The high position of the auto release bracket 21 forces the sunshade hook 31 to disengage with the sunshade receiver 29 which results in the release of the sunshade 11.

Since the sunshade trim 26 is free from the sunshade receiver 29, guide shoes 30 of the sunshade 11 can now slide back, from the front to the rear of the roof opening 5, inside the sunshade rails 24. The sunshade 11 moves from the front of the roof opening 5, i.e. where the sunshade hook 31 is engaged with the sunshade receiver 29, to the rear of the roof opening 5, i.e. where the auto release bracket 21 hits a trim stop 32, in one single step motion. This single step motion is exerted by the a bias force of the tensioning and rewinding devices 27 of the roller 22. As soon as the glass panel 12 is open the sunshade 11 is automatically, without manual intervention from the user, and totally, along the full length of the roof opening 5, rolled back around the stopper 20. In addition, the fact that the sunshade 11 is in a full open position as soon as the glass panel 12 is slightly open provides a clear indication of the two-way sunroof 10 being open.

FIG. 3C is a cross sectional view of FIG. 1 along the line A-A of an embodiment of a two-way sunroof 10 with the sunshade 11 and the glass panel 12 in the fully open position. When the glass panel 12 is in an open position, the auto release stopper 20 of the glass panel 12 has disengaged the sunshade hook 31 and let the sunshade 11 roll back to a fully open position. The top part of the auto release bracket 21 is positioned so as to be blocked by the auto release bracket 21 thus preventing the sunshade 11 from being moved to the closed position, as illustrated in FIG. 3C, when the glass panel 12 is in fully open position.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

The invention claimed is:

1. A sunroof assembly in a roof of a vehicle, comprising:
   a glass panel moveable from a fully closed position to a fully open position;
   an auto release stopper affixed to the glass panel;
   a sunshade beneath the glass panel including a retractable screen, the screen including a sunshade latch; and
   an auto release bracket that in the fully closed position of the glass panel contacts both the sunshade latch and the auto release stopper,
   wherein the auto release stopper engages with the sunshade latch in a latched position the roof of the vehicle and when the glass panel begins to open from the full closed position, the auto release stopper raises the auto release bracket to disconnect the sunshade latch from the roof and allow the screen to move from a fully closed to a fully open position.

2. The sunroof assembly as claimed in claim 1, further comprising:
   a tensioning and rewinding device that exerts a bias force on the screen toward the fully open position, the tensioning and rewinding device retracting the screen when the sunshade latch is disconnected from the roof.

3. The sunroof assembly as claimed in claim 1, wherein the sunshade latch includes a hook that attaches to a sunshade receiver of the roof, the hook being movable by the auto release bracket.

4. The sunroof assembly as claimed in claim 1, wherein a front portion of the screen includes a rigid trim to which the sunshade latch attaches.

5. The sunroof assembly as claimed in claim 1, wherein the screen is made of a light blocking flexible material that is wrapped around a roller.

6. The sunroof assembly as claimed in claim 2, wherein the tensioning and rewinding device comprises at least one torsion spring placed inside or adjacent a roller.

7. The sunroof assembly as claimed in claim 6, wherein the roller is maintained in place by a pair of rotating shafts attached to the roof.

8. The sunroof assembly as claimed in claim 1, wherein the auto release stopper is fastened on the glass panel using fastening devices such as a bolt, an adhesive or the combination of both.

9. The sunroof assembly as claimed in claim 4, further comprising:
   a pair of sunshade rails spaced from each other, one of the sunshade rails extending longitudinally along a first side edge of an opening of the roof while the other sunshade rail extends longitudinally along a second edge of the opening of the roof.

10. The sunroof assembly as claimed in claim 9, wherein the sunshade trim includes a pair of guide shoes disposed on each side of the sunshade trim that are inserted in the sunshade rails.

11. The sunroof assembly as claimed in claim 1, wherein a rear edge of the roof includes a sunshade trim stop in to stop the retraction of the sunshade.

12. The sunroof assembly as claimed in claim 1, wherein a predetermined shape of the auto release stopper is configured to block the auto release bracket in order to prevent the sunshade from being moved to the closed position while the glass panel is open.

* * * * *